(12) United States Patent
Wollack et al.

(10) Patent No.: US 11,340,392 B1
(45) Date of Patent: May 24, 2022

(54) LINEAR POLARIZATION SENSITIVE META-MATERIAL REFLECTOR AND PHASE MODIFICATION STRUCTURE AND METHOD

(71) Applicant: United States of America as represented by the Administrator of NASA, Washington, DC (US)

(72) Inventors: Edward Wollack, Greenbelt, MD (US); Kyle Helson, Columbia, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 495 days.

(21) Appl. No.: 16/585,612

(22) Filed: Sep. 27, 2019

(51) Int. Cl.
*G02B 5/30* (2006.01)
*G02B 1/00* (2006.01)
*G02B 5/08* (2006.01)

(52) U.S. Cl.
CPC ........... *G02B 5/3033* (2013.01); *G02B 1/002* (2013.01); *G02B 5/08* (2013.01); *G02B 5/3058* (2013.01)

(58) Field of Classification Search
CPC ...... G02B 5/3033; G02B 5/08; G02B 5/3025; G02B 5/3058; G02B 5/3083; G02B 5/0816; G02B 5/085; G02B 5/0875; G02B 5/1861; G02B 5/1809; G02B 1/002; G02B 26/06; G02B 27/28; G02B 27/10; G02B 27/14; G02B 27/283
See application file for complete search history.

(56) References Cited

U.S. PATENT DOCUMENTS 3,649,934 A * 3/1972 Matthaei ................... H01P 1/26
343/756
11,054,662 B2 * 7/2021 Mendis ................. H01Q 15/12

* cited by examiner

*Primary Examiner* — Stephone B Allen
*Assistant Examiner* — Adam W Booher
(74) *Attorney, Agent, or Firm* — Heather Goo; Bryan A. Geurts; Helen M. Gaius

(57) ABSTRACT

The present invention relates to electromagnetic meta-material structures to serve as linear polarization sensitive mirrors. Two distinct classes have been developed, including: 1) a phase cohering reflector which maintains the phase of both polarization states with a controlled delay between polarization states, and 2) a phase de-cohering reflector which preserves the phase of one polarization state and destroys the coherence in the other. These reflective structures enable mitigation of spurious resonances in dual-polarization optical systems and phase compensation between polarization states. These polarization control structures have applications in absorber coupled detectors and receiver systems for space-borne and sub-orbital remote sensing applications.

26 Claims, 4 Drawing Sheets

LINEAR POLARIZATION SENSITIVE META-MATERIAL REFLECTOR AND PHASE MODIFICATION STRUCTURE AND METHOD

ORIGIN OF THE INVENTION

The invention described herein was at least in-part made by an employee of the United States Government and may be manufactured or used by or for the Government of the United States of America for governmental purposes without the payment of any royalties thereon or therefor.

BACKGROUND OF THE INVENTION

1. Field of the Invention

The present invention relates to meta-material structures which serve as linear polarization sensitive mirrors. The configurations include: 1) a phase cohering reflector which maintains the phase of both polarization states with a controlled delay between polarization states, and 2) a phase de-cohering reflector which preserves the phase of one polarization state and destroys the coherence in the other. These reflective structures enable mitigation of spurious resonances in dual-polarization optical systems and phase compensation between polarization states.

2. Description of the Related Art

The present invention was created as a means to eliminate transmission resonances or trapped modes, which occur between polarizing grid analyzers and planar reflectors in quasi-optical polarization modulators. This optical configuration can be found in precision polarimetric instruments. This spurious resonant response degrades the instrumental polarization isolation, spectral response, and increases the experimental sensitivity to changes in the ambient environment (e.g., temperature, stress, gravitational loading, etc.).

A related issue occurs in absorber coupled polarization sensitive bolometers (PSBs). In this setting the difference in delay between the absorber structure for each polarization state and the back-termination reflector lead to imbalances in the coupling efficiency as a function of frequency. At frequencies where this difference is a significant fraction of the quarter-wavelength delay and the sensor's absorption response can be negatively impacted.

In the prior art, both polarization states are reflected at a common reference plane by a single, reflective termination. This does not allow compensation of differential delays between polarization states. Backing the grid analyzer with an absorptive termination does enable control over trapped modes, however, the emissive radiation loading penalty is increased significantly and is undesirable for infrared, low-noise polarimetric sensor applications (i.e., the emittance of termination increasing the noise of the sensors unless cooled, and the gird must be mechanically stable in order not to introduce systematic artifacts in the image). For similar topological reasons, this configuration is undesirable for polarization sensitive bolometers having readout electronics integrated directly behind the sensors' absorber structures to form a hybridized sensor array package.

Thus, polarization control structures which have applications in absorber coupled detectors and receiver systems for space-borne and sub-orbital remote sensing applications, and which address the above concerns, are desired.

SUMMARY OF THE INVENTION

The present invention relates to meta-material structures which serve as linear polarization sensitive mirrors. The configurations include: 1) a phase cohering reflector which maintains the phase of both polarization states with a controlled delay between polarization states, and 2) a phase de-cohering reflector which preserves the phase of one polarization state and destroys the coherence in the other. These reflective structures enable mitigation of spurious resonances in dual-polarization optical systems and phase compensation between polarization states.

The polarization control structures of the present invention address the concerns for polarization sensitive optical instruments in the prior art and have applications in absorber coupled detectors and receiver systems for space-borne and sub-orbital remote sensing applications.

In one embodiment, the two configurations of meta-material structures include a phase de-cohering reflector which provides the specified end goal for mitigation of trapped modes. The phase cohering reflector of the second configuration is used to balance the response of dual-polarization absorber coupled detectors structures. The responses of these meta-material structures are controlled though the geometry parallel plate waveguide and delay lines and the delay line backshort configuration.

In one embodiment, a linear polarization-sensitive mirror, includes: a structure formed of a sub-wavelength structured meta-material geometry; wherein the structure includes a plurality of parallel, interleaved conductive plates having a fixed slot width between the plates; wherein half of the parallel conductive plates have uniform ridges defining an upper surface forming a first reference plane, and half of the plates form a lower surface defining a second reference plane to achieve a polarization sensitive reflection; and wherein the structure is configured to provide one of a phase cohering reflector which maintains a phase of both linear, horizontal (H) and vertical (V) electric field polarization states with a controlled delay between the polarization states, or a phase de-cohering reflector which preserves a phase of one of the polarization states and destroys a coherence of the other of the polarization states.

In one embodiment, the geometry of the second reference plane is used to coherently or incoherently reflect input light.

In one embodiment, the sub-wavelength structured meta-material geometry is one of a subwavelength-patterned metal or a metallized substrate material.

In one embodiment, the plates forming the lower surface include a sloped surface which is cut at a 10-degree angle to reflect undesired polarization out of an optical path.

In one embodiment, when an input beam of the incident light interacts with the lower surface the horizontal polarization signal is suppressed.

In one embodiment, the plates forming the lower surface are of varying depth.

In one embodiment, the plates forming lower, interleaved surfaces have a random structure at a length scale of a predetermined wavelength of light.

In one embodiment, an input beam of the incident light passes the upper surface of the plates and scatters off the random structure to diffusely diffract or scatter the horizontal polarization state of said polarization states, suppressing a horizontally polarized electric field signal or an E (H-polarization) signal.

In one embodiment, a number of said plates having said random structure is set by a coherently illuminated area for said H-polarization.

In one embodiment, the lower surface of the plates is a stepped surface.

In one embodiment, a V/H-polarization sensitive phase delay compensation between the two polarization states under plane wave illumination is provided by the stepped surface.

In one embodiment, the surface of the mirror is shaped.

In one embodiment, the mirror is used in optical applications for polarization discrimination, including absorber coupled detectors and receiver systems for space-borne and sub-orbital remote sensing applications.

In one embodiment, a method of providing polarization discrimination, includes: providing a structure of a plurality of parallel, interleaved conductive plates having a fixed slot width between the plates, the structure being formed of a meta-material geometry; defining an upper surface of half of the parallel conductive plates having uniform ridges, to form a first reference plane, defining a lower surface of the other half of the plates, to form a second reference plane; wherein defining the first reference plane and the second reference plane achieves a polarization sensitive reflection; and providing one of a phase cohering reflector which maintains a phase of both linear, horizontal and vertical polarization states with a controlled delay between the polarization states, or a phase de-cohering reflector which preserves a phase of one of the polarization states and destroys a coherence of the other of the polarization states.

In one embodiment, the method further includes: suppressing a horizontally-polarized electric field signal, or an E(H-polarization) signal, by an input beam of incident light passing on the upper surface of the plates and scattering off the random structure to diffusely diffract or scatter the horizontal polarization state of the polarization states.

Thus, has been outlined, some features consistent with the present invention in order that the detailed description thereof that follows may be better understood, and in order that the present contribution to the art may be better appreciated. There are, of course, additional features consistent with the present invention that will be described below, and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawings includes exemplary embodiments of the disclosure and are not to be considered as limiting in scope.

DESCRIPTION OF THE INVENTION

Figure 1:
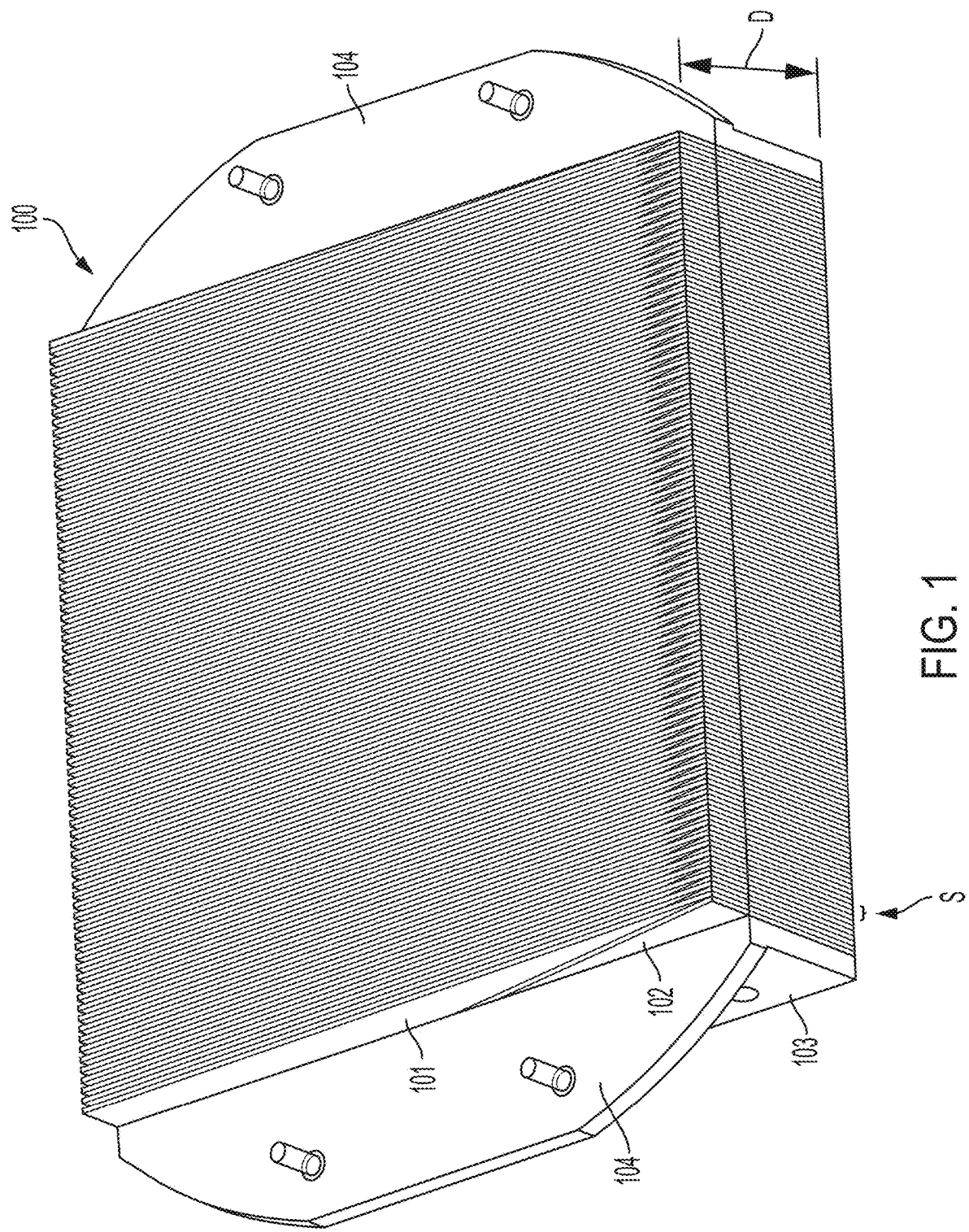
FIG. 1 depicts a mirror having interleaving plates, according to one embodiment consistent with the present invention.

The present invention relates to meta-material structures which serve as linear polarization sensitive mirrors. Two configurations have been identified which differ primarily in their delay geometry, and include: 1) a phase cohering reflector which maintains the phase of both polarization states with a controlled delay between polarization states, and 2) a phase de-cohering reflector which preserves the phase of one polarization state and through spatial averaging over a collimated beam, destroys the coherence in the other. These reflective structures enable mitigation of spurious resonances in dual-polarization optical systems and phase compensation between polarization states. The polarization control structures of the present invention have applications in absorber coupled detectors and receiver systems for space-borne and sub-orbital remote sensing applications.

In the realization of the innovation described, a halfspace, subwavelength array of finite thickness parallel conductive plates, or a metamaterial structure, serves as a polarization sensitive mirror. More specifically, the two distinct reflector configurations include: 1) a phase cohering device which maintains the phase of both linear polarization states with a differential delay controlled through the geometry within the unit cell and the parallelism maintained across the meta-material and 2) a phase de-cohering device which preserves the phase of one polarization state specified through its orientation to the meta-material surface and through spatial averaging over a collimated beam destroys the phase coherence of the other linear polarization state.

In one embodiment, the present invention approximates a half-space of sub-wavelength planar waveguides with shorted delays. The front of the structure coherently reflects the desired polarization. Depending on the desired mode of operation the delay lengths are either uniform (i.e., for phase cohering polarization reflection) or spatially varying between 0 and 180 degrees (i.e., for phase de-cohering reflection of the undesired polarization-mode in a collimated beam) across the illuminated region of the meta-material mirror.

In one embodiment, the phase de-cohering reflector preserves the phase of a polarization state specified through its orientation to the meta-material surface $P_1$, $P_2$ (see FIGS. 2A-2B, for example) and through spatial averaging over a collimated beam and destroys the phase coherence of the other linear polarization state. The bandwidth of the phase de-cohering mode of operation is limited by the onset of internal resonances within the shorted delay lines and the dispersion in the delay line impedance function. For both polarization sensitive reflector implementations described a fractional bandwidth of >0.2 is readily achievable through known transmission line design, modeling, and fabrication strategies.

In one embodiment, the present invention provides narrow-band performance for the differential phase balanced mode of operation. The bandwidth of this response can be increased though the use of multiple delays within the unit cell of the polarization sensitive meta-material.

Similarly, in one embodiment, the bandwidth of the slots S can be increased through the use of stepped impedance structures within a given delay-line.

In one embodiment, the linear polarization sensitive mirror 100 (see FIG. 1) is a corrugated metamaterial structure with uniform metallic ridges, constructed of interleaved, parallel plates of a suitable conductive material (i.e., metal, metallized plastic, etc.) of thickness, T.

In one embodiment, the conductive material is a patterned geometry realized from a bulk metal or a metallized substrate material (e.g., plastic, micromachined silicon, etc.), which is tailored to achieve a specific electromagnetic response, such as in this case, a polarization sensitive reflectance.

Half of the plates 101 are flat, and half of the plates 102 are cut at a 10-degree angle to reflect undesired polarization out of the optical path. Note that the thickness, T, of the plates can be any suitable thickness, as long as a unit cell in the meta-material structure is maintained as less than the wavelength of interest.

In one embodiment, the mirror 100 is a half-space sub-wavelength array of parallel conductive plates 101, 102, with uniform metallic ridges defining an upper reference plane $P_1$ (see FIGS. 2A-2B) and slots of width S, of varying depth D (e.g., $D_1$, $D_2$, $D_3$), defining a second surface $P_2$ (see FIG. 2) to achieve a polarization sensitive reflection. The plates 101, 102 are contained in holder 103 which has handles 104.

In one embodiment, the array has a periodicity or "pitch", P=T+S, which is small compared to the radiation wavelength of interest. In practice, apodization of the surface by a high f/optical beam on the device 200 allows the use of a plane wave approximation for modeling and design of a finite sized array structure.

In one embodiment, the meta-material polarization sensitive mirror 100 of the present invention is used in reflection within an optical system. The phase de-cohering embodiment of the present invention can be used in a collimated optical beam. The phase cohering embodiment of the present invention can be used either in a collimated, focused, or intermediate optical beam. The use at an incidence angle <45 degrees is preferable and will enable graceful degradation from the device performance observed at near normal incidence. For similar reasons the response improves with increasing f/of the incident optical beam.

In one embodiment, the half-space defined by this parallel-plate 101, 102 waveguide configuration 100 (see FIGS. 1-2B) is a polarization analyzer or finite thickness grid. For radiation aligned along the ridges on the upper surface $P_1$ of the plates 101, 102 the light is coherently reflected (i.e., incident radiation is beyond the cutoff wavelength, $\lambda_c=2S$, set by the slot spacing, S, and does not propagate appreciably into the slot volume).

Figure 2B:
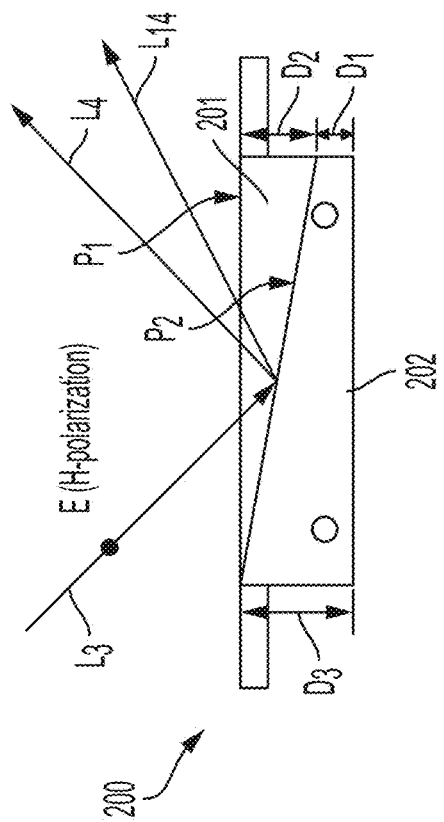
FIG. 2B shows input light ray, $L_3$, with a horizontal E-field polarization orientation of left to right (on the page), reflecting off the front surface of the sloped surface of the mirror, parallel to the long direction of the interleaving plates of FIG. 1, as light ray, $L_4$. The next layer has the opposite slope direction and is re-directed away as $L_{14}$. These lower sets of planes, $P_2$ (shown in figure) and $P_2'$ (the interleaved layer not shown), are used to coherently (specularly) reflect the light at two sets of angles which reduces the coherence across the aperture.
Figure 2A:
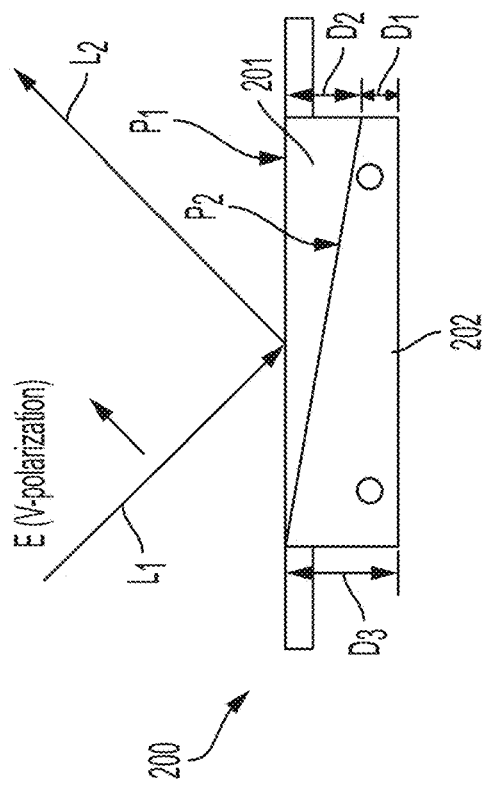
FIG. 2A shows light ray, $L_1$, with a vertical E-field polarization orientation of left to right (on the page), reflecting off the front surface of the mirror, parallel to the long direction of the interleaving plates of FIG. 1, as light ray, $L_2$, of an E-field orientation perpendicular to the long direction of the plates (coming out of the page, orthogonal to $L_1$).

In one embodiment, as shown in FIGS. 2A-2B, the polarization sensitive reflection arises from redirection to large angles (in a focused beam) or decoherence across the aperture (in collimated optical space).

As shown in FIG. 2A, in one embodiment, light $L_1$ with an E-field orientation of left to right (on the page), reflects off as $L_2$ the front surface of the mirror 200 parallel to the long direction of the plates 201. In one embodiment, light $L_2$ of E-field orientation perpendicular to the long direction of the plates 201, 202 (coming out of the page, orthogonal to $L_1$), passes the front surface of the flat plates 201, 202 and reflects off the upper surface $P_1$. This light is re-directed away as $L_2$.

Note that in this embodiment, and subsequent embodiments, the front surface and spacing of the interleaved plates 201, 202 of mirror 200, are the same.

In one embodiment, for the other polarization, light can propagate into the slots S, of the parallel plates 101, 102 of mirror 100, and the detailed geometry of the lower reference plane $P_2$ is used to coherently (specular) or incoherently (diffract/diffusely) reflect. Input light $L_3$ passes the front surface of the flat plates 201, 202 and reflects off the sloped surface $P_2$, as shown in FIG. 2B.

In one embodiment, FIG. 2B shows input light ray, $L_3$, with a horizontal E-field polarization orientation of left to right (on the page), reflecting off the front surface of the sloped surface of the mirror, parallel to the long direction of the interleaving plates of FIG. 1, as light ray, $L_4$. The next layer has the opposite slope direction and is re-directed away as $L_{14}$. These lower sets of planes, $P_2$ (shown in figure) and $P_2'$ (the interleaved layer not shown), are used to coherently (specularly) reflect the light at two sets of angles which reduces the coherence across the aperture.

In other words, input light $L_3$ impacts the surface $P_2$ of the mirror 200, and polarization reflection sensitive reflection arises from redirection to large angles (in a focused beam) or decoherence across the aperture (in collimated optical space). The output light $L_4$ is reflected from the visible layer—$L_{14}$ from the hidden layer—and this pattern is repeated throughout the array structure. When placed in a collimated beam (or focused beam with an acceptance angle less than the angle, the beam is diverted by the lower surface $P_2$) and the horizontally polarized electric-field, E(H-polarization), signal is suppressed.

Figure 3B:
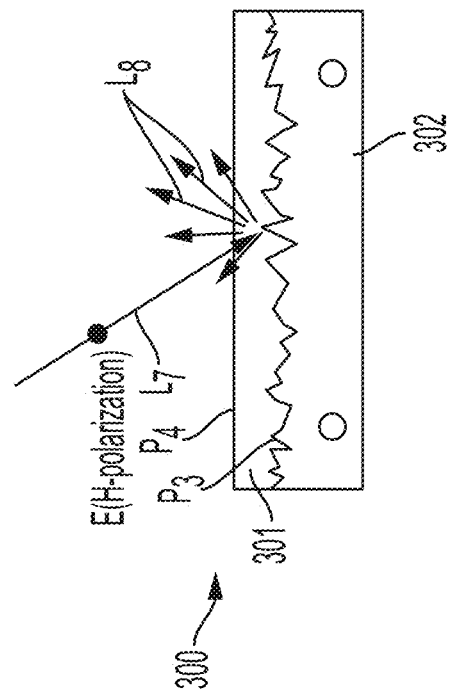
FIG. 3B shows light $L_7$ of a horizontal E-field polarization orientation perpendicular to the long direction of the plates (coming out of the page), passing the front surface of the flat plates and scattering off the random interior surface $P_3$ to diffusely diffract/scatter the horizontal polarization (as output light $L_8$). For each interleaved layer $P_3$ is suitably randomized to minimize coherence between layers.
Figure 3A:
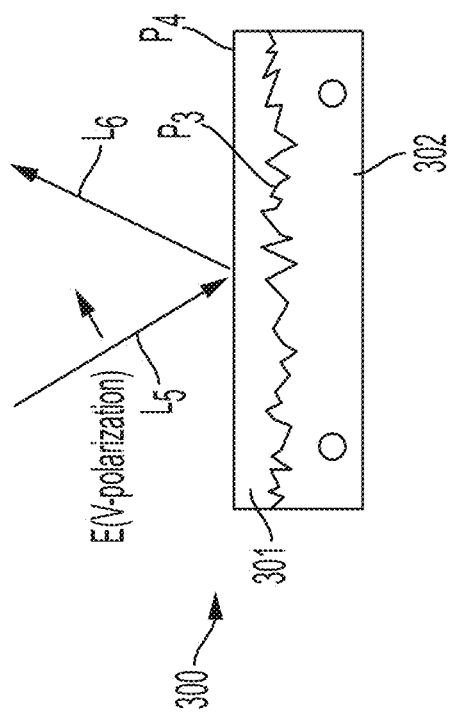
FIG. 3A shows input light $L_5$ with a vertical E-field polarization orientation of left to right (on the page) and output light $L_6$ reflecting off the front surface $P_4$ of the mirror parallel to the long direction of the plates.

In another embodiment, as shown in FIGS. 3A-3B, the polarization sensitive meta-material mirror 300 reflects the vertical polarization (input light $L_5$ with an E-field orientation of left to right (on the page) and output light $L_6$ in FIG.

3A) off the front surface $P_4$ of the mirror parallel to the long direction of the plates 301, 302. In one embodiment, light $L_5$ of E-field orientation perpendicular to the long direction of the plates 301, 302 (coming out of the page), passes the front surface of the flat plates 301, 302 and scatters off the random interior surface $P_3$ to diffusely diffract/scatter the horizontal polarization (output light $L_6$ in FIG. 3B). For each interleaved layer $P_3$ is suitably randomized to minimize coherence between layers. In one embodiment, the random surface $P_3$ of the mirror 300 (see FIG. 3) is roughened at a scale comparable to wavelength of light, so that the light $L_8$ will be diffusely reflected or scattered in many directions (see FIG. 3B). As a result, the horizontal polarization (E(H-polarization)) signal is suppressed.

In one embodiment, the number of random layers 302 is a design choice set by metal-material design and the coherently illuminated area for the H-polarization (i.e., approximately the pitch and the area size for focused and collimated geometries, respectively). This has general utility in controlling resonances (or cavity) modes in polarimetric systems. Such needs arise in the context of polarization duplexing and modulation realized with wire grid or similar analyzers.

Figure 4B:
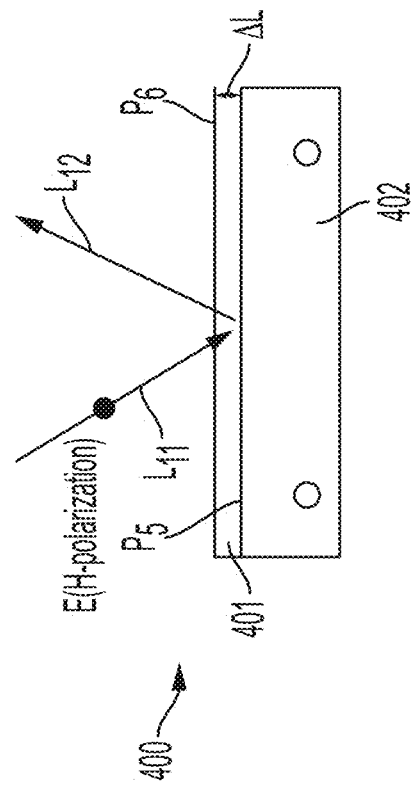
FIG. 4B shows light $L_{11}$ with a horizontal E-field polarization orientation perpendicular to the long direction of the plates (coming out of the page), passing the front surface of the flat plates and scattering off the stepped interior surface $P_5$ to be reflected as output light $L_{12}$.
Figure 4A:
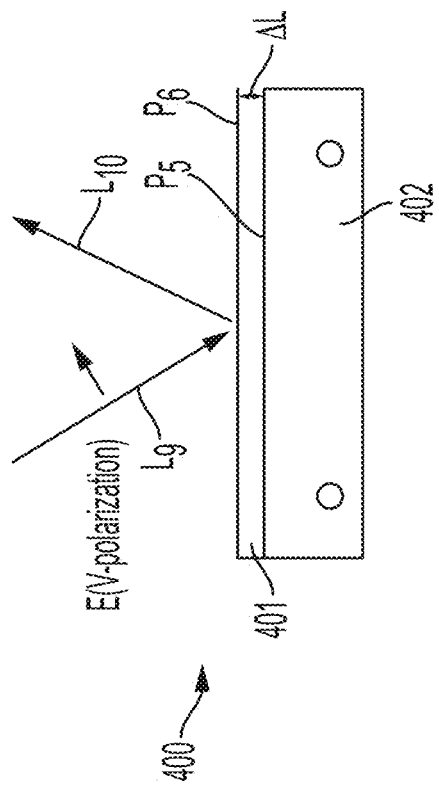
FIG. 4A shows a V/H-polarization sensitive phase delay compensation with a stepped interior surface (dimension indicated by $\Delta L$), where input light $L_9$ with a vertical E-field polarization orientation of left to right (on the page) reflects off the front surface $P_6$ of the mirror parallel to the long direction of the plates, as $L_{10}$.

In another embodiment, as shown in FIGS. 4A-4B, a V/H-polarization sensitive phase delay compensation is shown, with a stepped interior surface of dimension $\Delta L$. In one embodiment, the polarization sensitive meta-material mirror 400 reflects the vertical polarization (input light $L_9$ with an E-field orientation of left to right (on the page) and output light $L_{10}$ in FIG. 4A) off the front surface $P_6$ of the mirror parallel to the long direction of the plates 401, 402.

In one embodiment, light $L_{11}$ of E-field orientation perpendicular to the long direction of the plates 401, 402 (coming out of the page), passes the front surface of the flat plates 401, 402 and scatters off the stepped interior surface $P_5$ to be reflected (output light $L_{12}$ in FIG. 4B).

In one embodiment, the stepped surface with a dimension indicated by $\Delta L$, is chosen to provide a desired phase delay between the two polarization states under plane wave illumination. Both polarization states are coherently reflected (i.e., $L_{10}$ and $L_{12}$ in FIGS. 4A and 4B, respectively); however, this allows compensation in a polarimetric system (i.e., such a need can arise in absorber coupled polarization sensitive sensors). Thus, this embodiment shows a signal phase delayed relative to vertical polarization.

Note that if the illumination is not an ideal plane wave (e.g., a spherical, cylindrical, or other wave), then in one embodiment, the reference plane defined by the two surfaces $P_5$, $P_6$ could be suitably adjusted (i.e., the mirrors' 400 surfaces would be shaped). The mirror 400 curvature and optical f/would need to be suitably large.

In one embodiment, the method of manufacture and material selection is largely dependent of the frequency/temperature range envisioned for the device's 100 end use. For example, the structure 100 may be constructed out of separate pieces (e.g., interleaved plates 101, 102, discrete elements, etc.), be realized through subtractive manufacturing methods such as direct machining methods or etched out of a single piece of bulk material (e.g., metal or suitable dielectric material which is subsequently metalized) or be realized from an additive manufacturing process (e.g., 3D printing, laser sintering, etc.).

The present invention has the advantages of requiring little maintenance and depending on the implementation, follows the maintenance guide of similar wire grid and micro-machined detector technologies. However, the present invention has a maximum operating power limit and heat-sinking requirement for cryogenic operation to enable proper operation. These constraints are largely determined by the infrared properties of the materials used in the implementation and are not outside the bounds set by other quasi-optical components used in such settings.

The present invention has the advantage of enabling functional polarization capabilities, which are not available in the prior art. These properties allow both (phase cohering reflector) trapped modes arising from finite polarization isolation to be mitigated, and (phase de-cohering reflector) delays in dual polarization structures to be compensated, etc. Thus, these two configurations enable greater control of signals within systems with dual polarization.

The two forms of the invention described can be used in wide range of optical applications where polarization discrimination is desired. The two primary intended end uses are in the elimination of trapped modes in polarization modulator and correction of phase delay in planar polarization sensitive bolometers for use in precision instrumentation applications.

The polarization control structures of the present invention have applications in absorber coupled detectors and receiver systems for space-borne and sub-orbital remote sensing applications. More generally, the polarization sensitive reflector structures of the present invention could find use in any microwave or submillimeter circuit application where polarization grids are used to diplex signals. As such, the structure and techniques described could find use in a variety of system architectures employing spatial power combiners, optical beam formers, and delay lines.

The present invention can be realized in the microwave though the far-IR with known fabrication techniques. Differences in implementation will largely arise from the pallet of materials and techniques available for guiding light at different wavelengths.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A linear polarization-sensitive mirror, the mirror comprising:
   a structure formed of a sub-wavelength structured meta-material geometry;
   wherein said structure includes a plurality of parallel, interleaved conductive plates having a fixed slot width between said plates;
   wherein half of said parallel, interleaved conductive plates have uniform ridges defining an upper surface forming a first reference plane, and half of said parallel, interleaved conductive plates form a lower surface defining a second reference plane, to achieve a polarization sensitive reflection; and
   wherein said structure is configured to provide one of a phase cohering reflector which maintains a phase of both linear horizontal and vertical polarization states with a controlled delay between said polarization states, or a phase de-cohering reflector which preserves a phase of one of said polarization states and destroys a coherence of the other of said polarization states.

2. The mirror of claim 1, wherein a geometry of said second reference plane is used to coherently or incoherently reflect input light.

3. The mirror of claim 2, wherein said subwavelength structured meta-material geometry is one of a sub-wavelength-patterned metal or a metallized substrate material.

4. The mirror of claim 3, wherein said plates forming said lower surface include a sloped surface which is cut at a 10-degree angle to reflect undesired polarization out of an optical path.

5. The mirror of claim 4, wherein on condition that an input beam of incident light interacts with said lower surface, a horizontal polarization signal is suppressed.

6. The mirror of claim 3, wherein said plates forming said lower surface are of varying depth.

7. The mirror of claim 6, wherein said plates forming lower, interleaved surfaces have a random structure at a length scale of a predetermined wavelength of light.

8. The mirror of claim 7, wherein an input beam of incident light passes said upper surface of said plates and scatters off said random structure to diffusely diffract or scatter said horizontal polarization state of said polarization states, suppressing a horizontally polarized electric field signal or an E(H-polarization) signal.

9. The mirror of claim 8, wherein a number of said plates having said random structure is set by a coherently illuminated area for said H-polarization.

10. The mirror of claim 3, wherein said lower surface of said plates is a stepped surface.

11. The mirror of claim 10, wherein a V/H-polarization sensitive phase delay compensation between said two polarization states under plane wave illumination is provided by said stepped surface.

12. The mirror of claim 11, wherein a surface of said mirror is shaped.

13. The mirror of claim 1, wherein the mirror is used in optical applications for polarization discrimination, including absorber coupled detectors and receiver systems for space-borne and sub-orbital remote sensing applications.

14. A method of providing polarization discrimination, the method comprising:
   providing a structure of a plurality of parallel, interleaved conductive plates having a fixed slot width between said plates, the structure being formed of a sub-wavelength structured meta-material geometry;
   defining an upper surface of half of said parallel, interleaved conductive plates having uniform ridges, to form a first reference plane,
   defining a lower surface of the other half of said parallel, interleaved conductive plates, to form a second reference plane;
   wherein defining said first reference plane and said second reference plane achieves a polarization sensitive reflection; and
   providing one of a phase cohering reflector which maintains a phase of both linear, horizontal and vertical polarization states with a controlled delay between said polarization states, or a phase de-cohering reflector which preserves a phase of one of said polarization states and destroys a coherence of the other of said polarization states.

15. The method of claim 14, wherein a geometry of said second reference plane is used to coherently or incoherently reflect input light.

16. The method of claim 15, wherein said subwavelength structured meta-material geometry is one of a sub-wavelength-patterned metal or a metallized substrate material.

17. The method of claim 16, wherein said plates forming said lower surface include a sloped surface which is cut at a 10-degree angle to reflect undesired polarization out of an optical path.

18. The method of claim 17, wherein when an input beam of incident light interacts with said lower surface, a horizontal polarization signal is suppressed.

19. The method of claim 18, wherein said plates forming said lower surface are of varying depth.

20. The method of claim 16, wherein said plates forming lower, interleaved surfaces have a random structure at a length scale of a predetermined wavelength of light.

21. The method of claim 20, the method further comprising:
   suppressing a horizontally polarized electric field signal or an E(H-polarization) signal, by an input beam of incident light passing on said upper surface of said plates and scattering off said random structure to diffusely diffract or scatter said horizontal polarization state of said polarization states.

22. The method of claim 21, wherein a number of said plates having said random structure is set by a coherently illuminated area for said H-polarization.

23. The method of claim 16, wherein said lower surface of said plates is a stepped surface.

24. The method of claim 23, wherein a V/H-polarization sensitive phase delay compensation between said two polarization states under plane wave illumination is provided by said stepped surface.

25. The method of claim 24, wherein a surface of said mirror is shaped.

26. The method of claim 16, wherein the mirror is used in optical applications for polarization discrimination, including absorber coupled detectors and receiver systems for space-borne and sub-orbital remote sensing applications.

* * * * *